(12) United States Patent
Wathington

(10) Patent No.: US 10,171,751 B2
(45) Date of Patent: Jan. 1, 2019

(54) SUPERIMPOSING AN IMAGE ON AN IMAGE OF AN OBJECT BEING PHOTOGRAPHED

(71) Applicant: Chad-Affonso Wathington, San Francisco, CA (US)

(72) Inventor: Chad-Affonso Wathington, San Francisco, CA (US)

(73) Assignee: Chad-Affonso Wathington, San Francisco, CA (US)

( * ) Notice: Subject to any disclaimer, the term of this patent is extended or adjusted under 35 U.S.C. 154(b) by 14 days.

(21) Appl. No.: 15/162,565

(22) Filed: May 23, 2016

(65) Prior Publication Data

US 2016/0344947 A1 Nov. 24, 2016

Related U.S. Application Data

(60) Provisional application No. 62/165,413, filed on May 22, 2015.

(51) Int. Cl.
| | | |
|---|---|---|
| *H04N 1/00* | (2006.01) | |
| *G02B 27/14* | (2006.01) | |
| *H04N 5/225* | (2006.01) | |
| *H04N 5/232* | (2006.01) | |
| *H04N 5/262* | (2006.01) | |

(52) U.S. Cl.
CPC ......... *H04N 5/2621* (2013.01); *G02B 27/144* (2013.01); *H04N 1/00095* (2013.01); *H04N 1/00307* (2013.01); *H04N 5/2254* (2013.01); *H04N 5/23206* (2013.01); *H04N 5/23293* (2013.01); *H04N 2201/0084* (2013.01)

(58) Field of Classification Search
None
See application file for complete search history.

(56) References Cited

U.S. PATENT DOCUMENTS

| | | | | |
|---|---|---|---|---|
| 3,376,800 | A * | 4/1968 | Faasch | G03B 17/12 |
| | | | | 359/633 |
| 4,183,644 | A * | 1/1980 | Tureck | G03B 15/08 |
| | | | | 359/629 |
| 5,867,741 | A * | 2/1999 | Maruyama | H04N 5/225 |
| | | | | 348/64 |
| 2009/0205239 | A1* | 8/2009 | Smith, III | F41G 1/38 |
| | | | | 42/122 |
| 2013/0033746 | A1* | 2/2013 | Brumfield | G02B 23/105 |
| | | | | 359/401 |
| 2015/0163387 | A1* | 6/2015 | Lee | H04N 5/238 |
| | | | | 349/2 |

* cited by examiner

*Primary Examiner* — Twyler L Haskins
*Assistant Examiner* — Quan Pham
(74) *Attorney, Agent, or Firm* — Jennifer A. Haynes; David Lewis

(57) ABSTRACT

A camera may include a display that projects a picture of the user's choice onto an image sensor array (or film), which is superimposed on the image of an object from a photograph that the lens system projects on the same image sensor array. Optionally, a pellicle mirror may be used to combine the two images. Optionally, the camera includes a transmitter for receiving pictures from a remote device, which are superimposed on the image of the object being photographed.

26 Claims, 12 Drawing Sheets

SUPERIMPOSING AN IMAGE ON AN IMAGE OF AN OBJECT BEING PHOTOGRAPHED

CROSS-REFERENCE TO RELATED APPLICATIONS

This application claims priority benefit of U.S. Provisional Patent Application No. 62/165,413, entitled "Superimposing an Image on an Image of an Object Being Photographed," filed May 22, 2015, by Chad-Affonso Wathington, which is incorporated herein by reference.

FIELD

This specification relates to photography.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Single lens reflex cameras are well known. In a conventional camera, superimposing images on the image of an object being photographed needs to be done after the photograph is taken.

BRIEF DESCRIPTION

In the following drawings like reference numbers are used to refer to like elements. Although the following figures depict various examples of the invention, the invention is not limited to the examples depicted in the figures.

FIG. 3A shows a front view, FIG. 3B shows a cross section and FIG. 3C shows a perspective view.

SUMMARY

In one embodiment, a system is provided having an image sensor array, a lens array located in the system so as to project the image of an object from a photograph onto an image sensor array; and an electro-optic display, which is located in the system, so that when activated a picture of choice is projected onto the image sensor array simultaneously with the image of the object.

Any of the above embodiments may be used alone or together with one another in any combination. Inventions encompassed within this specification may also include embodiments that are only partially mentioned or alluded to or are not mentioned or alluded to at all in this brief summary or in the abstract.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-7 is a brief description of each element, which may have no more than the name of each of the elements in the one of FIGS. 1-7 that is being discussed. After the brief description of each element, each element is further discussed in numerical order. In general, each of FIGS. 1-12 is discussed in numerical order and the elements within FIGS. 1-12 are also usually discussed in numerical order to facilitate easily locating the discussion of a particular element. Nonetheless, there is no one location where all of the information of any element of FIGS. 1-12 is necessarily located. Unique information about any particular element or any other aspect of any of FIGS. 1-12 may be found in, or implied by, any part of the specification.

Figure 1:
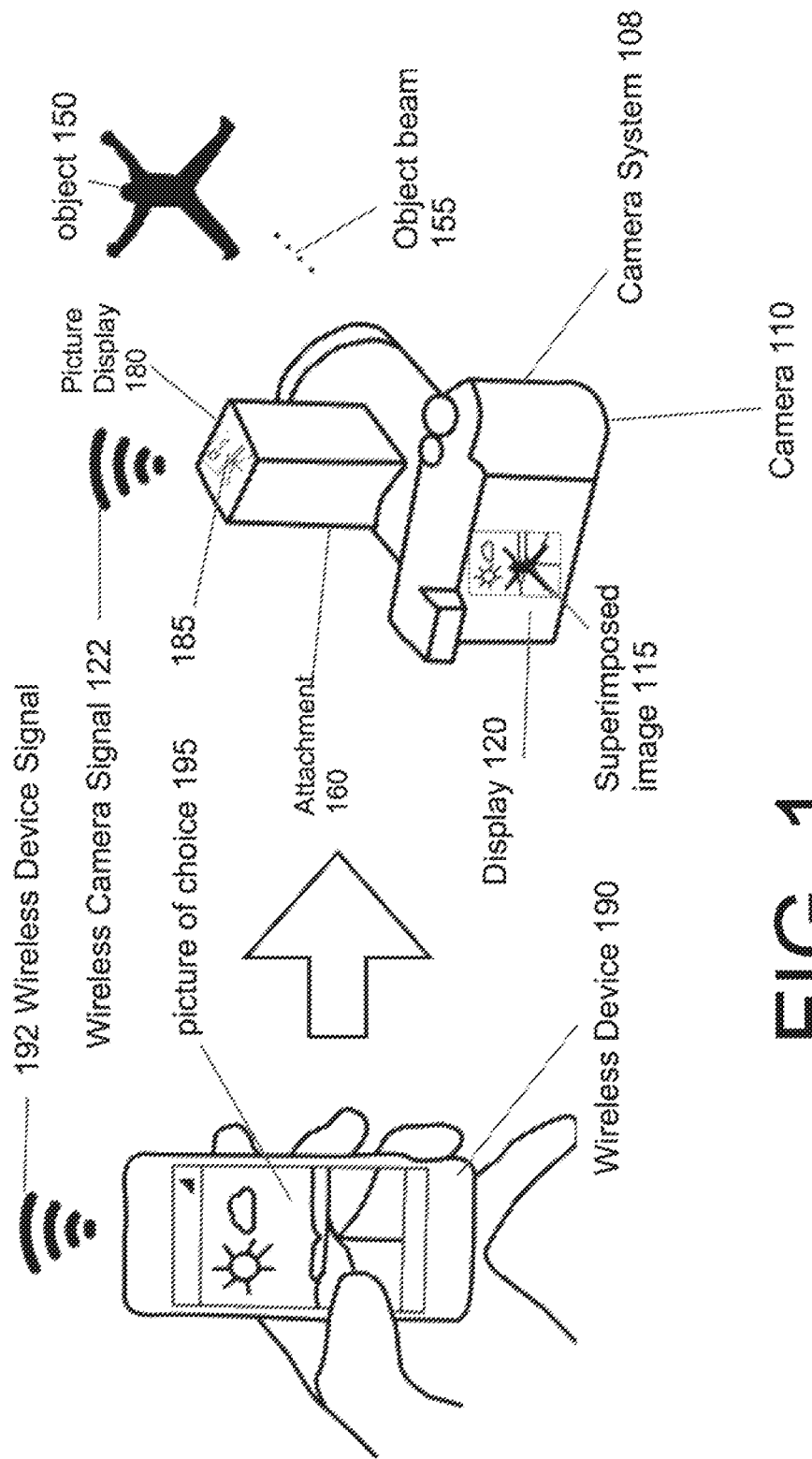
FIG. 1 shows an embodiment of a system for combining a picture downloaded and transmitted to a camera and an image of an object photographed by the camera into one image.

FIG. 1 shows an embodiment of a system 100 for combining a picture of choice from a wireless device and an object from a photograph into one image. The system 100 may include a camera system 108, camera 110, superimposed image 115, camera display 120, wireless camera signal 122, an object 150, object beam 155, attachment 160, picture display 180, picture of choice 185, a wireless device 190, a wireless device signal 192, and picture of choice 195. In other embodiments system 100 may not have all of the elements or features listed and/or may have other elements or features instead of or in addition to those listed.

System 100 may combine a picture of choice from a wireless device and an object from a photograph into one image. Camera system 108 is equipped with a display and a transmitter for communicating with a wireless device. In an embodiment, camera system 108 may be a digital camera (digicam), a camera that encodes digital images and stores the images for later reproduction (however, an analog camera system 108 having film could be used instead). Although camera system 108 is drawn as a standalone camera, telephone cameras are examples of digital cameras, and in an embodiment camera system 108 may be incorporated in a telephone, desk top, tablet, or laptop computer or other device. However, the digital camera used in the system for combining a picture of choice (e.g., downloaded by the user) and a photograph of an object into one image may be configured as shown in FIGS. 2-5.

Camera system 108 may be equipped with an internal electro-optic display that projects a picture of the user's choice (e.g., a pastoral scene) onto an image sensor array (or film), which is superimposed on the photograph of an object that the lens system projects onto the same image sensor array (or film). In general, anywhere in this specification, where an image sensor or sensor array is referred to, film or another light sensitive medium capable of recording an image may be substituted.

As an example, a user may take a picture of friend superimposing the friend's body (object) on a background of another location (a picture of choice) to give the impression that the friend was at that location. Optionally, to avoid having the object being photographed look like a ghost (as a result of seeing another image in the location where the object is), the portion of the photograph where the object appears may be caused to be blank or black. Alternatively, or additionally, the ghost effect can be removed or reduced with software and/or by adjusting the relative brightness of the two images with respect to one another. Camera system 108 may include a camera 110 and an attachment that attaches to camera 110, via a lens mount.

Superimposed image 115, which may also be referred to as a "new image," is the combination of the picture of choice (the downloaded picture) with the photograph (the object). The method used to superimpose the two pictures can vary. Some of the methods of superimposing images are discussed in conjunction with reference to FIGS. 2-7 and 9-10.

Camera display 120 displays the superimposed new image to the user. For example, camera display 120 may be a liquid crystal display (LCD) (or another electro-optic display, such as an LED display) and permits the user to view the scene to be photographed and settings such as ISO speed, exposure, and shutter speed. In another embodiment camera display 120 may be a view finder, which may display the superimposed images projected on a screen. Optionally, camera system 108 may also allow the user to view the picture of choice and the object superimposed separately on one or two camera displays 120.

Wireless camera signal 122 may come from any type of transmitter within the camera and may send a signal to the wireless device to send the picture of choice. The camera system 108 may include one or more transmitters for different types of wireless communications, such as a radio transmitter, Bluetooth transmitter, infrared transmitter, and/or sound transmitter. The camera system 108 may also include a receiver for receiving a wireless device signal. Using the transmitter and the wireless device, the user may send a picture of choice from the wireless device to the camera system 108. Optionally, the camera system 108 may receive pictures from a network, such as a wireless network. Optionally, the camera system 108 may receive a picture by uploading the images via a wire from a portable memory device. Optionally, the camera system 108 may include a port for plugging in a memory card or another memory device (e.g., a USB memory stick or portable drive).

Object 150 is the object in the object image external to the camera or the image that is being photographed. The object 150 in FIG. 1 is shown as a figure of a human jumping with arms and legs outstretched. The object 150 can be any part of the photograph that the user would like to combine with another picture. Although in FIG. 1, the image of object 150 forms the foreground of the combined image the image of object 150 may be used as the background of the combined image, and the user may wish to superimpose an image of an animal or a human, taken from a picture that was downloaded from the Internet or elsewhere, into the photograph. Optionally, camera system 108 (or any of the cameras of this specification) may be capable of combining the image of the picture of choice and the image of the object 150, via a microprocessor, even though the two images are projected on the image sensor at different times. For example, a first of the two images is projected on the image sensor and stored by the microprocessor and then a second of the two images is projected on the image sensor and stored by the microprocessor, which then combines the two stored images to form a superposition of the two images.

Object beam 155 is the light that is reflected or emitted from object 150 and sent towards camera system 108.

Attachment 160 is the attachment that attaches to camera 110 to form camera system 108.

Picture display 180 is optional. Picture display 180 is a display on attachment 160 that displays a picture of choice that user imported from elsewhere, such as from another device. Picture display 180 allows the user to verify that the camera received the correct picture of choice. Using the picture display the user may view the picture of choice without the image of the object super imposed upon the image of the picture of choice.

Picture of choice 185 is the picture imported from elsewhere. Picture of choice is viewable, prior to being superimposed on the image of object, using picture display 180.

Wireless device 190 may find and/or download, and then send, a picture of choice 195 to the camera system 108. Wireless device 190 can be any device that can be used to find and transmit a picture of choice to the camera system 108. In one embodiment, the wireless device 190 is a computer and the picture is transmitted to the camera system 108, via a wireless connection or by a direct connection to the computer, via a (Universal Serial Bus) USB connector or other conventional interface or a chip. Examples of wireless devices include but are not limited to, a smart phone, laptop, tablet computer, and/or a personal computer (PC).

Wireless device signal 192 may send a picture of choice 195 to the camera system 108. Wireless device signal 192 may come from any type of transmitter that can communicate with the camera transmitter. The transmission may be performed wirelessly for example. Although FIG. 1 depicts camera system 108 and wireless device 190 communicating wirelessly, camera system 108 and wireless device 190 may include communication ports (e.g., a Universal Serial Bus (USB) port) for attaching a cable and transmitting images, such as the image downloaded from the Internet (the picture of choice 195) that is combined with the image of the object 150.

Picture of choice 195 is the picture that is downloaded from the Internet (or elsewhere) by the wireless device 190 or photographed by wireless device 190, and then sent from wireless device 190 to camera system 108. The user can find the picture of choice 195 on the internet, download the picture of choice 195, and send the picture of choice 195 to the camera system 108 (e.g., by transmitting the picture of choice 195 wirelessly via the wireless device signal 192). In FIG. 1, the picture of choice 195 is a pastoral landscape scene with a sun and a cloud. Picture of choice 195 is the same as picture of choice 185 except picture of choice 195 is the picture while still in wireless user device 190, whereas picture of choice 185 is the same picture after arriving at camera system 108.

Optionally, as discussed earlier, the camera system 108 may receive images for the picture of choice 195 from any network, such as a wireless network. Optionally, the camera system 108 may receive for the picture of choice 195 by uploading the images, via a wire or wirelessly, from a portable memory device. Optionally, the camera system 108 may include a port for plugging in a memory card or another memory device (e.g., a USB memory stick or portable drive). Optionally, the picture of choice 195 may be a photograph that was previously taken by camera system 108, stored in memory, and then retrieved for being combined with the image of object 150.

Figure 2:
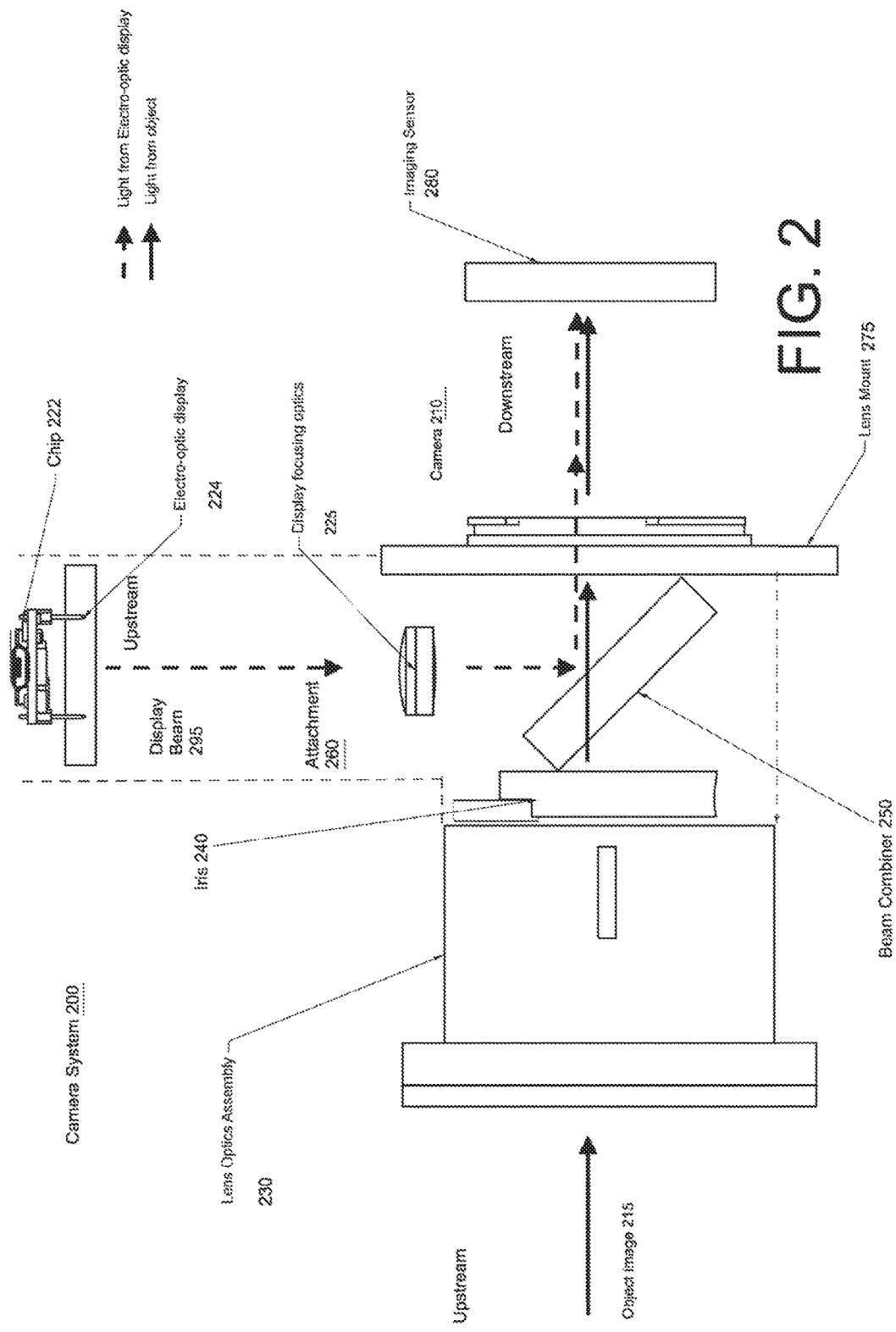
FIG. 2 shows an embodiment of a camera that may be used with the system of FIG. 1.

FIG. 2 shows an embodiment of a camera system 200 that may be used with the system 100 of FIG. 1. The camera system 200 may include camera 210, object beam 215, chip 222, electro-optic display 224, display focusing optics 225, lens optics assembly 230, iris 240, beam combiner 250, camera attachment 260, lens mount 275, image sensor 280, and display beam 295. In other embodiments camera 210 may not have all of the elements or features listed and/or may have other elements or features instead of or in addition to those listed. The numerical values of the labels of the feature of FIG. 2 are be listed in an order based on the movement of a light beam from upstream (where the light beam starts) to downstream (where the light beam ends at the imaging sensor).

Camera system 200 is an embodiment of camera system 108 that uses a beam combiner (e.g., a pellicle mirror) to combine the display beam and the object beam to create a superimposed image.

Camera 210 may be an embodiment of camera 110, which was discussed in conjunction with FIG. 1.

Object beam 215 (also called light from object) is the light beam produced by the object that is captured and eventually focused onto the imaging sensor. The light that reflects off of, or is emitted by, object 150 (FIG. 1) produces object beam 215.

The chip 222 may include a microcontroller and wireless communications unit. The wireless communications unit may include a receiver and optionally a transmitter. The receiver may be used to receive the picture of choice 195 from the wireless device 190 and to optionally send messages (e.g., using wireless camera signal 122 in FIG. 1) to the wireless device 190 (e.g., requesting the wireless device 190 to send the picture of choice 195). The wireless communications unit of chip 222 may be a radio, an infrared communications unit, a Bluetooth unit, an ultrasound communications unit, or other wireless communications unit. In an alternative embodiment, instead of transmitting an image wirelessly to camera system 200, a physical translucent photograph may be inserted into camera system 200, and the photograph may be backlit to produce the display image.

The electro-optic display 224 is also referred to herein as the "display." The electro-optic display 224 creates an image based on the electrical signals received from the microcontroller of chip 222. The display beam carrying the picture of choice 185 (FIG. 1) produced by the display 224 is sent to a beam combiner to be combined with the object beam 215. Electro-optic display 224 may be any of a number of electro-optic displays, such as a backlit liquid crystal display, light emitting diode display, organic light emitting diode display, a backlit translucent photo, or other electro-optic display.

Display focusing optics 225 focuses the display beam from electro-optic display 224, which carries the image information of the picture of choice 195 and eventually focuses the beam, through the beam combiner onto the imaging sensor. The image from the picture of choice 185 is projected through the display focusing optics 225 (a lens array) in a light beam (display beam) that is perpendicular to object beam 215 (which is the light beam from the object 150 (FIG. 1) that is being photographed). The display focusing optics 225 can be a lens array or a lens group.

Chip 222, electro-optic display 224, display focusing optics 225, lens optics assembly 230, iris 240, and beam combiner 250 can be included as a camera attachment. Camera attachment attaches to a camera at the location where a retrofocus or other lens attaches to a camera.

The lens optics assembly 230 may include one or more lenses for focusing object beam 215, by sending object beam 215 through a beam combiner and then focusing object beam 215 on the imaging sensor. In an embodiment, the lens optics assembly 230 may be a retro focus lens, which may be a wide-angle lens that uses an inverted telephoto configuration. Lens optics assembly 230 may include a positive lens group and two negative lens groups with the positive group, upstream with respect to the direction of travel of the incoming light, at the front, so as to reduce the back focal distance of the lens (which is the distance between the back of the lens and the image plane) to be shorter than the focal length, so that the camera 210 can be more compact and less cumbersome than were a retrofocus lens not used. However, the second negative lens group is also placed at the front to increase the back focal distance of the lens, so that the image forms on the opposite side of the beam combiner as the lens optics assembly 230 and as the object 150.

Iris 240 includes an adjustable aperture (an opening of adjustable size) to allow light to enter and fall upon the image plane (e.g., the image sensor, which maybe a Charge Couple Device CCD sensor, film, etc).

The beam combiner 250 combines the object beam 215 and the beam from the electro-optic display 224 (the display beam), and sends the combined beam to an image sensor (or to film). In an embodiment, beam combiner 250 is a pellicle mirror, which may be an ultra-thin (e.g. 0.02 mm of Mylar), ultra-lightweight semi-transparent mirror employed in the light path of an optical instrument, splitting the light beam into two separate beams, both of reduced light intensity (pellicle is a diminutive of pellis, a skin or film). In other words, in an embodiment, a pellicle mirror is used as a beam combiner 250 to superimpose the image from the display (picture of choice 195) on the image from the object 150, so that both images arrive at the image sensor array, and display focusing 225 and lens optics assembly 230 are adjusted so that both images arrive simultaneously in focus (or somewhat out of focus) to the same degree on the image sensor array. The lens optics assembly 230 projects the image of the object 150 (carried in object beam 215) through the beam combiner 250 (e.g., through a pellicle mirror). The beam from the electro-optic display 224 is reflected by the pellicle mirror bending the beam by 90 degrees so that both beams are joined and transmitted to the image sensor array. In an embodiment in which beam combiner 250 is a pellicle mirror, the pellicle mirror of the camera of FIG. 1 is an ultra-thin, ultra-lightweight semitransparent mirror that combines the two light beams into one beam. The thinness of the mirror is chosen to be at least thin enough so as to practically eliminate image doubling due to a non-coincident weak second reflection from the nominally non-reflecting surface. That is, the mirror is chosen to be thin enough so that an average person would not notice the doubling of the image. The mirror may be chosen to be thin enough so that an average human eye cannot detect the doubling of the image, because the effect is too small. Additionally, or alternatively, the same pellicle mirror may be used by a view finder to split the light from the object, so that the user may see the same view of the object as is projected on the image sensor array (albeit without the image of the display 195 superimposed on the image of the object 150).

Attachment 260 attaches to a camera 210 at the location where a retrofocus or other lens may be attached to a camera. Attachment 260 includes chip 222, electro-optic display 224, display focusing optics 225, lens optics assembly 230, iris 240, beam combiner 250, and the lens mount. Attachment 260 may be an embodiment of attachment 160.

Optional, lens mount 275 is a mechanical interface, which may also include an electrical interface, between camera 210 and attachment 260. Optionally, lens mount 275 may include an additional lens to help focus the combined image coming from beam combiner 240 onto the image sensor. Lens mount 275 allows the user to change lenses according to the type of object the user would like to photograph. In an alternative embodiment camera 210 and attachment 260 are one integral unit that do not easily detach.

Image sensor 280 may be any light sensitive component that can capture and store an image, such as an array of phototransistors (e.g., a photosensitive CMOS array), an array of photodiodes, or a charge coupled device (e.g., an array of capacitors that are caused to be charged by the incident light), for example. Alternatively, film may be used instead of an image sensor array. The image sensor 280 may use a charge coupled device (CCD) or a CMOS sensor, for example to capture images, which can be transferred or stored in a memory card or other storage inside the camera 210 for later playback or processing. If image sensor 280 is a CCD sensor, the image sensor 280 may include one amplifier for all of the pixels, for example. If images sensor 280 is a CMOS array, each pixel in the image sensor 280 may include its own amplifier. The image sensor 280 turns light into discrete signals. The number of pixels in the image sensor 280 determines the camera's "pixel count," which determines the resolution of the images captured. The image projected onto the image sensor 280 may be electronically transferred to another display, which displays the combined image to the user, so that the user may see the combined image and determine if that is the image that the user would like to save as a photograph. Image sensor 280 is located in camera 210.

Display beam 295 is the light from electro-optic display 224, which carries image information for the picture of choice 185 (see FIG. 1, the picture that is downloaded by the user, that has been transmitted to the camera transmitter). Display beam 295 is created by electro-optic display 224, focused/projected by display focusing optics 225 (a lens group) through beam combiner 250 and then onto image sensor 280 (at beam combiner 250 object beam 215 and display beam 295 are combined).

Focus Equalization

In an embodiment, the display focusing optics 225 (the lens array) in front of the electro-optic display 224 focuses the image from the picture of choice 185 so that the image from the picture of choice 185 is just as much in focus or just as much out of focus as the image from the object 150 that is produced by lens optics assembly 230. The purpose of making sure the degree of focus/defocus is equal is so that any electronic processing of the image after the image has been captured by the image sensor array 280 to correct for the image from the object 150 being out of focus, will also place the background image (e.g., the picture of choice 185) equally into or out of focus, so that the image from the electro-optic display 224 and the image of the object 150 can be electronically processed together and do not need to be electronically processed separately to bring the entire composite image (the superimposed image 115) into focus. In an embodiment, both images may be able to be focused independently. More specifically, in an embodiment, brightness of the two images and/or the focus of the two images may be controlled independently.

In another embodiment, the image from the picture of choice 185 may be defocused electronically prior to being produced by the electro-optic display 224, instead of defocusing the image using the display focusing optics 225 (the lens group in front of the display) to defocus the image from the display (the picture of choice 185). In an embodiment in which the electro-optic display 224 produces a defocused image, display focusing optics may be optional.

Optionally, the refresh rate of the electro-optic display 224 (which creates the image that is superimposed on the image of the object 150) is synchronized with the shutter and/or the sample rate of the sensor 280. Optionally, the refresh rate is chosen to be significantly higher than the shutter speed to avoid unwanted image errors. Optionally, other beam combiners 250 may be used instead of a pellicle mirror beam combiner 250.

Optionally, the location of the electro-optic display 224 and the lenses for photographing the object can be switched, so that the image of the object 150 is reflected by the beam combiner 250 and bent 90 degrees and the image from the display (the picture of choice 195, FIG. 1) is transmitted through the beam combiner 250.

Optionally, the electro-optic display 224 may be connected to a processor that senses the lens settings and then computes what the image on the electro-optic display 224 should be, so as to be synchronized with the images arriving at the image sensor 280 so that the object beam 215 and display beam 295 are equally in focus or out of focus. Optionally, the camera 210 may include a processor, and a memory storing a ray tracing algorithm that computes what the image should be on the electro-optic display 224, depending on the location of the electro-optic display 224, the configuration of display focusing optics 225 (if present), and the configuration of the lens optics assembly 230. Examples of ray tracing algorithms are described in "Ray Tracing from the Ground Up," by Kevin Suffern ISBN-13: 978-1466508484 ISBN-10: 1466508485 Edition: $2^{nd}$, for example.

FIGS. 3A-3C show an embodiment of a camera that may be used as the camera of FIG. 2. FIG. 3A shows a front view, FIG. 3B shows a cross section and FIG. 3C shows a perspective view.

FIG. 3A shows a front view of an embodiment of a camera attachment 300 that may be used as the camera of FIG. 2. The camera attachment 300 may include microcontroller and chip 322, electro-optic display 324, and lens optics assembly 330. In other embodiments camera attachment 300 may not have all of the elements or features listed and/or may have other elements or features instead of or in addition to those listed.

Camera attachment 300 attaches to a camera at the location where a retrofocus or other lens attaches to a camera. Camera attachment 300 may be an embodiment of attachment 260.

Chip 322, electro-optic display 324, and lens optics assembly 330 are embodiments of microcontroller and chip 222, electro-optic display 224, and lens optics assembly 230, which were discussed in conjunction with FIG. 2.

FIG. 3B shows a cross section of an embodiment of the camera system 308, which may include camera attachment 300. The camera attachment 300 may include chip 322, electro-optic display 324, display focusing optics 325, lens optics assembly 330, aperture iris 340, beam combiner 350, camera attachment 360 and lens mount 375. Camera system 308 may also include image sensor 380 of the camera. In other embodiments camera system 308 may not have all of the elements or features listed and/or may have other elements or features instead of or in addition to those listed.

Camera attachment 300, camera system 308, chip 322, electro-optic display 324, display focusing optics 325, lens optics assembly 330, aperture iris 340, beam combiner 350, lens mount 375, and imaging sensor 380 are embodiments of attachment 260, camera system 200, microcontroller and chip 222, electro-optic display 224, display focusing optics 225, lens optics assembly 230, iris 240, beam combiner 250, lens mount 275, and image sensor 280, respectively, which were discussed in conjunction with FIG. 2.

FIG. 3B shows a cross sectional view of attachment 300. The chip 322 may include a transmitter and/or control circuitry for controlling the display 324 is adjacent to and in back of the display 324, the transmitter and/or the control circuitry may be located elsewhere on the camera system 308.

FIG. 3C also shows camera system 308 with chip 322, electro-optic display 324, lens optics assembly 330 and lens mount 375 and image array 380.

FIG. 3C shows a perspective view of camera attachment 300. Chip 322, electro-optic display 324, lens optics assembly 330 lens mount 375, and image sensor 380 are embodiments of chip 222, electro-optic display 224, lens optics assembly 230, and lens mount 275 and image sensor 280, which were discussed in conjunction with FIG. 2.

Figure 4:
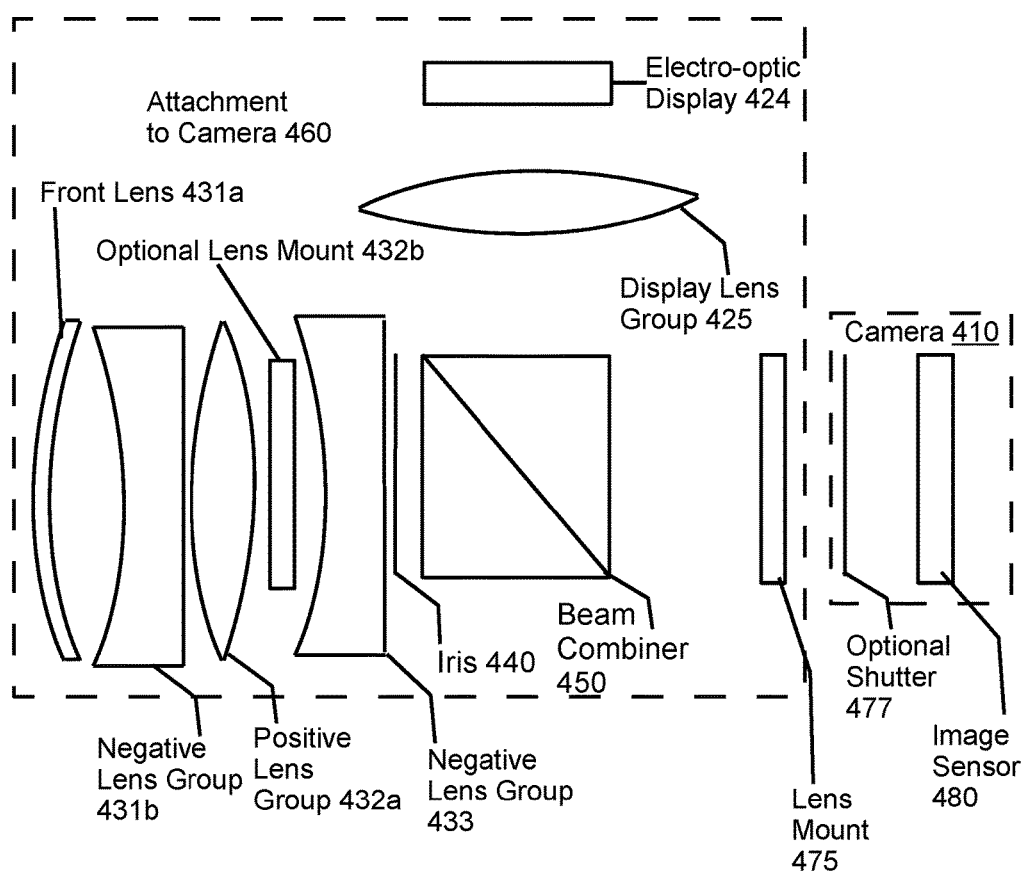
FIG. 4 shows a block diagram of an embodiment of a lens array for use in the camera of FIGS. 2-3C.

FIG. 4 shows a block diagram of an embodiment of a camera system 400. Camera system 400 may include camera 410, electro-optic display 424, display lens group 425, front lens 431a, negative lens group 431b, positive lens group 432a, optional lens mount 432b, negative lens group 433, iris 440, beam combiner 450, attachment 460, lens mount 475, optional shutter 477, and image sensor 480. In other embodiments camera system may not have all of the elements or features listed and/or may have other elements or features instead of or in addition to those listed.

FIG. 4 shows a lens array that may be used in camera systems 108, 200, and/or 308. Lens array 401 is the lens array that may be used in camera systems 108, 200, and/or 308. Lens array 401 may include three lens groups that are in front of the camera. A combination of lenses can be used focus light to form an image. A simple lens (a single piece of material made from transparent materials such as glass, then ground and polished to a desired shape) can be used or a compound lens (consisting of several simple lenses usually along a single axis) can be used.

Camera 410 may be an embodiment of camera 110 and/or 210. Electro-optic display 424 is an embodiment of electro-optic display 224 in FIG. 2, electro-optic display 324 in FIG. 3 and electro-optic display 524 in FIG. 5.

Display lens group 425 may include any type of lens, lens group or lens array that focuses the beam from the electro-optic display of the picture of choice through the beam combiner to the image sensor. Display lens group 425 is an embodiment of display focusing optics 225.

Front lens 431a receives the light from object 150 (FIG. 1). Front lens 431a may be a transparent protective cover that protects the rest of lens array 401 from damage. Negative lens group 431b and negative lens group 433 expands the beam from the photograph and lengthens the distance at which the beam comes to a focal point. Negative lens group 431b and negative lens group 433 can be used in the camera of FIGS. 2 and 3A-3C to focus the beam from the photograph (the object) through the beam combiner to the image array. The second negative lens group 433 may function to extend the distance at which the image is formed, because the distance between the lenses and the image sensor is slightly larger than is typical (because of the pellicle mirror being angled at 45 degrees), being located in the path of the object beam.

Positive lens group 432a narrows the beam from the photograph and in combination with the negative lens groups 431b and 433 focuses the beam through the beam combiner onto the image sensor. Lens optics assembly 230 may include a positive lens group and two negative lens groups that have a similar arrangement as in FIG. 4.

The negative and positive lenses are placed with the positive lens group between the negative lenses, upstream with respect to the direction of travel of the incoming light, at the front (where the first negative lens and the positive lens form a retrofocus lens), so that the camera can be more compact and less cumbersome than were a retrofocus lens not used. However, the second negative lens group is also placed at the front to increase the back focal distance of the lens, so that the image forms on the opposite side of the beam combiner as the lens optics assembly and as the object.

Optional lens mount 432b may be used for mounting any lens to the rest of the system instead of negative lens group 431b and positive lens group 432a, so that the beam splitter and electro-optic display may be added to any camera having a detachable lens, between the lens and the camera.

Figure 3:
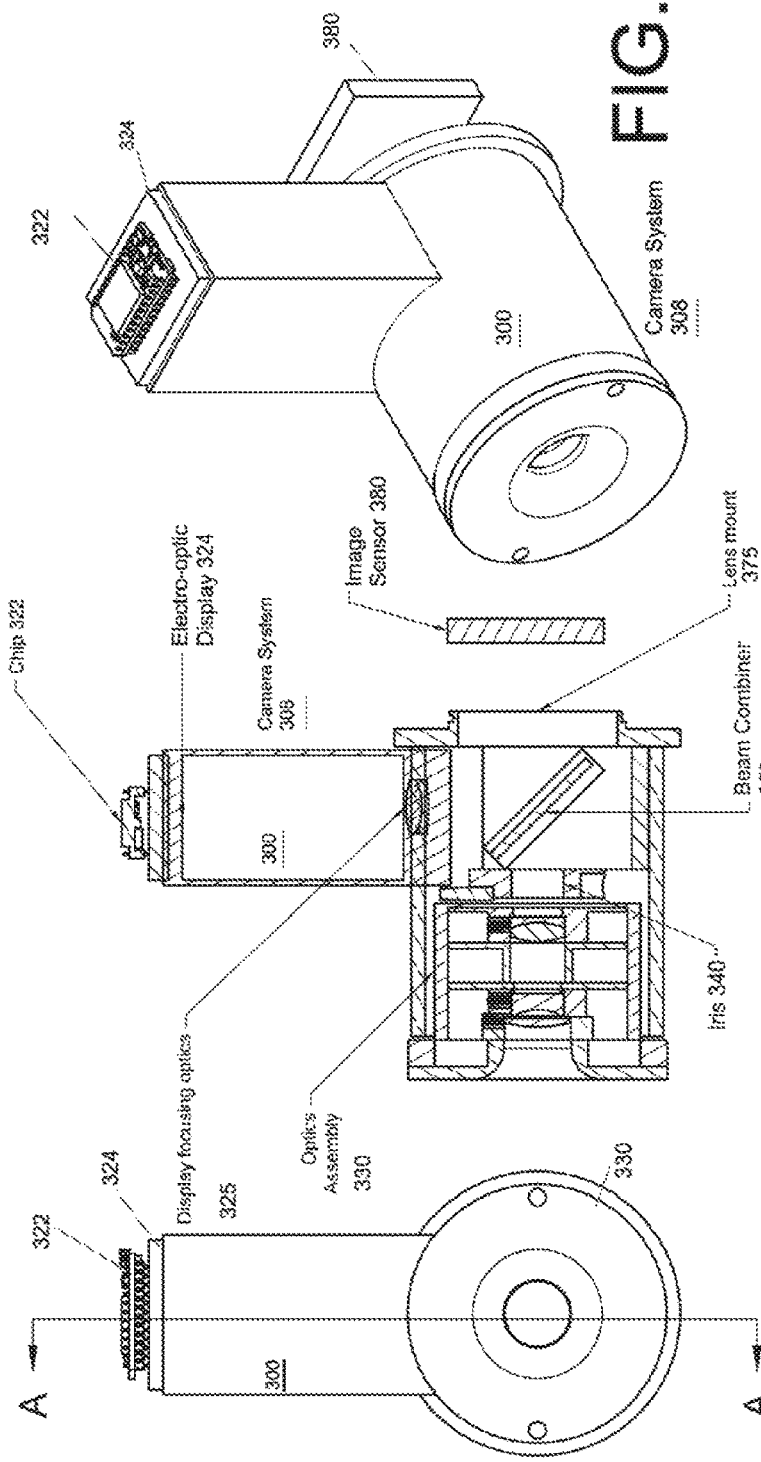
FIGS. 3A-3C show an embodiment of a camera that may be used as the camera of FIG. 2.

Iris 440 is an embodiment of aperture iris 240 in FIG. 2, and iris 340 in FIG. 3. In some embodiments, the iris can be replaced with an electro-optic light valve that can change the shape of the iris to get different textural effects.

Beam combiner 450 is an embodiment of beam combiner 250 in FIG. 2, and beam combiner 350 in FIG. 3.

Attachment 460 may include the entire set of optical components within the dashed lines of FIG. 4, which is contained within the assembly shown in FIGS. 3A-3C, without the image sensor. Attachment 460 may an embodiment of attachment 260 and/or camera attachment 300. Attachment 460 attaches and detaches from camera 410 (e.g., attachment 460 attaches by hand without the need for tools to attach and detach attachment 460). Optionally, attachment 460 may be constructed from two detachable components that detach from one another. One of the two detachable components of attachment 460 may include a retrofocus lens or negative lens group 431b and positive lens group 432a, whereas the second detachable component may include the rest of the components of the attachment 460. By dividing attachment 460 into two detachable components, the second detachable component can be used with any commercially available lens made for one another and the second component is just inserted between the commercially available lens and camera. Optionally, negative lens group 433 may also be included in the detachable unit with lens groups 431b and 432a. The second of the two detachable components may include all of the rest of the components of attachment 460.

Lens mount 475 is an embodiment of lens mount 275 in FIG. 2, and lens mount 375 in FIG. 3, which allows attachment 460 to be attached to any camera having a detachable lens.

Shutter 477 is optional and may be included in an embodiment in which the camera 410 has film instead of an image sensor. Shutter 477 functions to determine the exposure time of the film. The shutter 477 prevents the film from being overexposed. Any of a range of different shutter devices can be used. When a leaf shutter (the lens shutter) is used, the exposure time is determined by the interval between opening and closing of the metal leaves. When a focal plane shutter is used, a set of cloth curtains is pulled across the film plane with a carefully determined gap between the two curtains allowing exposure.

Image sensor 480 is an embodiment of image sensor 280 in FIG. 2 and/or image sensor 380 in FIG. 3.

Figure 5:
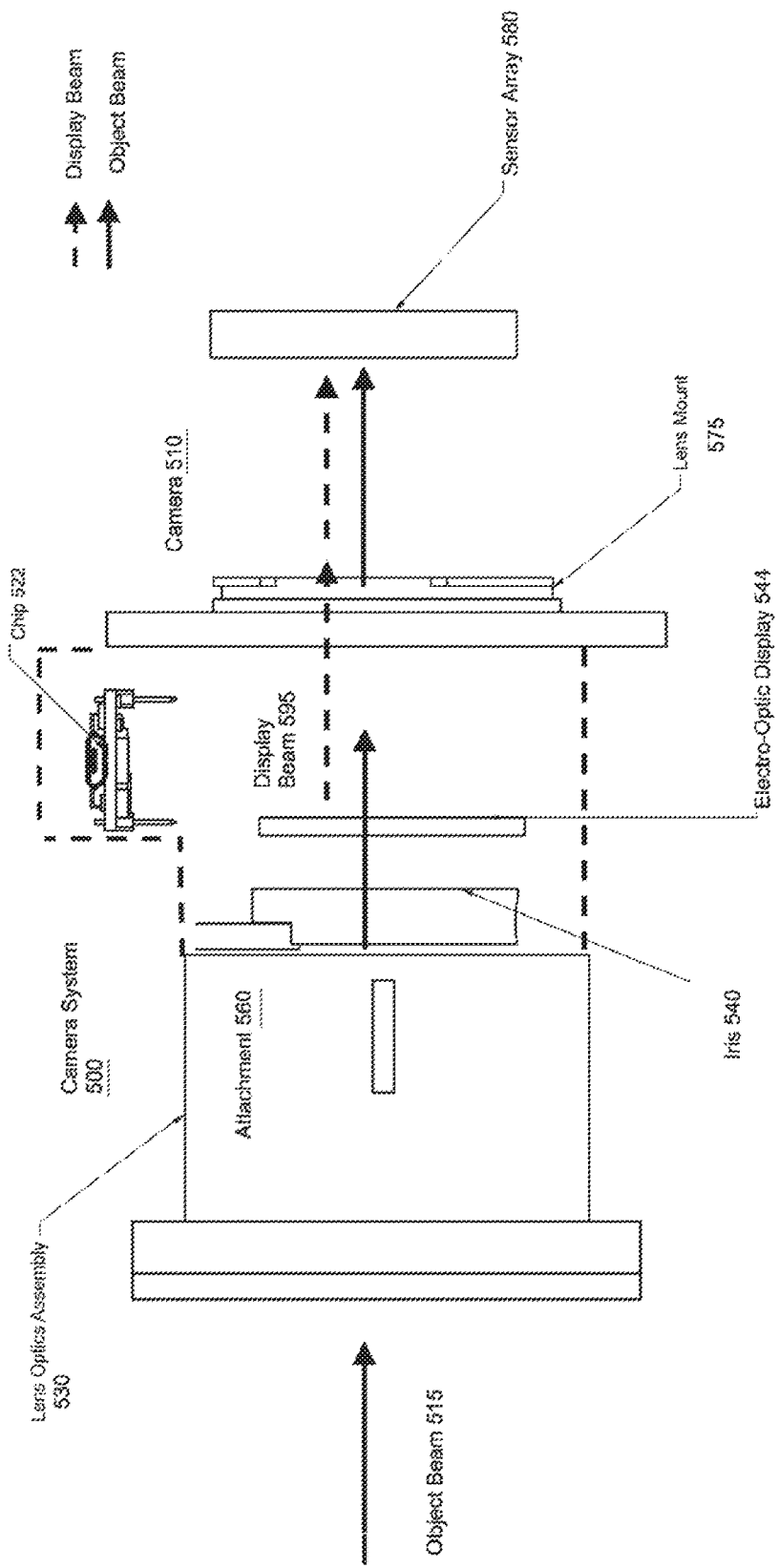
FIG. 5 shows another embodiment of the camera of FIG. 1, which does not include a pellicle lens.

FIG. 5 shows an embodiment of a camera 510 that can be used in the system of FIG. 1 which does not use a pellicle lens as a beam combiner (see 250 in FIG. 2).

The camera 510 may include object beam 515, chip 522, lens optics assembly 530, aperture iris 540, transparent electro-optic display 544, attachment to camera 560, lens mount 575, imaging sensor 580, and light from electro-optic display 595. In other embodiments camera 510 may not have all of the elements or features listed and/or may have other elements or features instead of or in addition to those listed. The features will be listed in an order based on the movement of a light beam from upstream (where the light beam starts) to downstream (where the light beam ends at the imaging sensor).

Object beam 515, chip 522, lens optics assembly 530, aperture iris 540, attachment to camera 560, lens mount 575, imaging sensor 580, and light from electro-optic display 595 are embodiments of object beam 215, chip 222, lens optics assembly 230, iris 240, attachment to camera 260, lens mount 275, image sensor 280, and display beam 295 discussed in conjunction with FIG. 2.

Transparent electro-optic display 544 creates an image in response to the electrical signals received from the controller of chip 522. The image from the object 150 passes through the display 544. The display 544 creates an image. The beam carrying the image from the object is modified by the transparent electro-optic display 544, so that the beam exiting the display has a combination of the image from the object 150 and the image created by the display (the picture of choice 185). For example, the display 544 may keep the pixels in the center completely transparent so that the foreground of the image from the object 150 passes through the display 544 unaltered. Whereas, the pixels in the background area may be made translucent but colored, so as to create a background image that is taken from the picture downloaded from the interne 185. The transparent electro-optic display 544 is used to superimpose the images in the embodiment shown in FIG. 5.

In other words, instead of using a pellicle mirror (as in FIG. 3), transparent display 544 is located in the beam path 515 of the light coming from the object being photographed 150. In other words, in this embodiment, the function of the pellicle mirror is replaced by locating the transparent electro-optic cell (e.g., a transparent liquid crystal display or other transparent electro-optic display) in the beam path to thereby superimpose an image on the incoming image from the object 150. In an embodiment, the transparent electro-optic display 544 is located between the lens array 530 and the lens mount 575. Optionally, the image projected by the transparent display 544 is electronically defocused, so that the image from the display (picture of choice) is just as much in focus or just as much out of focus as the image from the object, as in the embodiment of FIGS. 2 and 3. Electro-optic display 544 may be any of a number of electro-optic displays, such as a backlit liquid crystal display, light emitting diode display, organic light emitting diode display, a backlit translucent photograph, or other electro-optic display.

Figure 6:
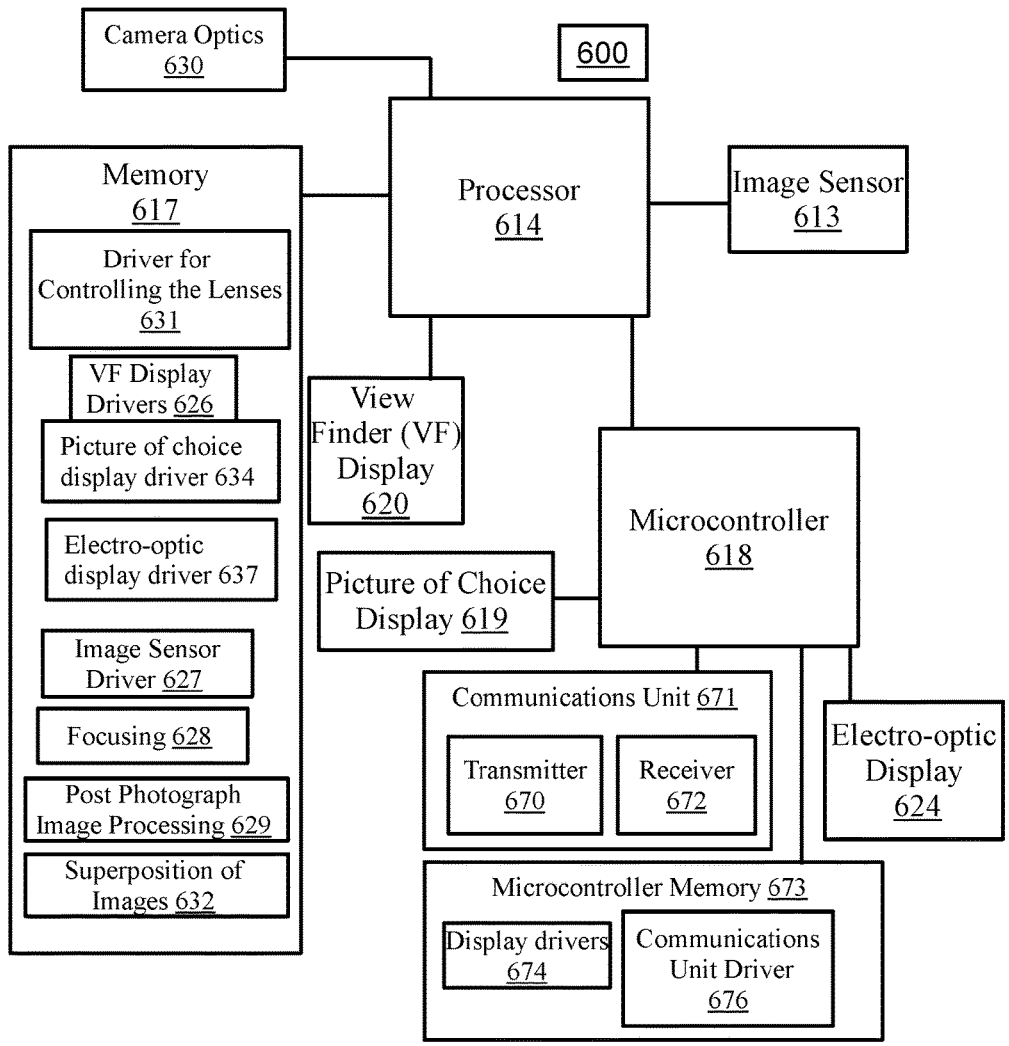
FIG. 6 shows a block diagram of an embodiment of the electronics in the camera for use in the system of FIG. 1.

FIG. 6 shows a block diagram of an embodiment of the electronics for a camera system 600 for use in the system of FIG. 1-5. The camera system 600 may include image sensor 613, processor 614, memory 617, microcontroller 618, picture of choice display 619, view finder display 620, electro-optic display 624, display drivers 626, image sensor driver 627, focusing 628, post photograph image processing 629, camera optics 630, driver for controlling the lenses 631, superposition of images 632, picture of choice display driver 634, electro-optic display driver 637, communications Unit 671 which includes transmitter 670, receiver 672, microcontroller memory 673, which includes display drivers 674, and communications unit driver 676. In other embodiments camera system 600 may not have all of the elements or features listed and/or may have other elements or features instead of or in addition to those listed.

Camera system 600 has a separate processor and microcontroller. In an embodiment, the microcontroller is located on and controls the attachment 460, or portion of the camera system having the electro-optic display, whereas the processor controls the other functions of the camera system 600.

Image sensor 613 may be an embodiment of image sensor 280 in FIG. 2, image sensor 380 in FIG. 3 or image sensor 580 in FIG. 5

Processor 614 controls camera functions that are not related to the electro-optic display or functions that are not part of the attachment having the electro-optic display. For example, processor 614 may control the focusing (see dashed lines in the figure) and may provide tools for processing images after the images are taken. Optionally, the focusing can be done manually. Processor 614 is optional.

Microcontroller 618 sends electric signals to the electro-optic display to send a beam of light that creates an image of the picture of choice 195. Microcontroller 618 may be included in an embodiment of chip 222 in FIG. 2, chip 322 in FIG. 3 and chip (microcontroller and wireless radio) 522 in FIG. 5.

Memory 617 is the memory system of processor 614, which may be used for working space, storing machine instructions, and storing pictures that were taken. In an embodiment of the memory 617, for each piece of hardware that the processor/microcontroller interacts with there may be a software driver, which the processor 614 uses for converting machine instructions read or produced by the processor 614 into signals that accomplish the desired task.

Picture of choice display 619 functions to display the picture of choice 195 (the picture downloaded or chosen from another choice by the user).

View finder display 620 functions to display the view that the user points the camera at, which includes object that generates object image 150. In other words, when taking a picture, view finder display 620 displays object image 150.

Electro-optic display 624 may be electro-optic display 224 in FIG. 2, electro-optic display 324 in FIG. 3, or electro-optic display 524 in FIG. 5.

Display drivers 626 are used by processor 614 to control the view finder display, if one is present.

Image sensor driver 627 is used by processor 614 to interface with the image sensor 613.

Focusing 628 may include machine instructions, which when implemented by processor 614, cause processor 614 to adjust the distance between lenses to be focus the object light onto image sensor 613.

Post photograph image processing 629 includes one or more machine instructions, which when implemented by processor 614 cause processor 614 to enhance the photographs taken and/or to process the image in other manners after the picture is captured. Post photograph image processing 629 may cause processor 614 to present to the user one or more tools that the user may use to modify photographs that were taken.

Camera optics 630 is an optical lens or assembly of lenses used in conjunction with a camera body and mechanism to make images of objects either on photographic film or on other media capable of storing an image chemically or electronically. Camera optics 630 may include lens optic assembly 230, 330, or 430, or lenses 531-533, for example Driver for controlling the lenses 631 is used by processor 614 for controlling the lenses.

Superposition of images 632 includes one or more instructions, which when implemented by processor 614 adjusts the focus of the lenses to cause the object image and the image of the picture of choice 195 to be equally in or out of focus at the image sensor 613.

Picture of choice display driver 634 is used by the processor 614 for controlling the picture of choice display 619.

Electro-optic display driver 637 is used by the processor 614 and/or the microcontroller 618 for controlling the electro-optic display 624.

Communications unit 671 receives incoming signals from other devices, sends signals to other devices, under the control of the microcontroller 618. In an embodiment, communications unit 671 may include a radio that is controlled by microcontroller 618. In an embodiment, communications unit 671 may include a Bluetooth communications device, an infrared communications device, a microwave communications device and/or an ultrasound communications device, for example.

Transmitter 670 is the transmitter of communications unit 671. Transmitter 671 may include a speaker, an antenna for sending signals, and/or a light source. Receiver 672 receives communications signals for communications unit 671. Receiver 672 may include an antenna, a microphone, and/or a light detector.

Microcontroller memory 673, which includes display drivers 674, and communications unit driver 676. Microcontroller memory 673 may be used for working space, storing machine instructions, and storing pictures that were taken and/or information received by the electro-optic display. In an embodiment of the memory 673, for each piece of hardware that the processor/microcontroller interacts with there may be a software driver, which the microcontroller 618 uses for converting machine instructions read or produced by the processor 614 and/or microcontroller 618 into signals that accomplish the desired task.

In another embodiment, focusing 628, camera optics 630, driver for controlling the lenses 631, and superposition of images 632 may be located in microcontroller memory 673 and implemented by microcontroller 618.

In another embodiment, a system is provided with a film, and a lens array that projects light onto an image sensor, and an electro-optic display which is located in the system, so that, when activated, a picture of choice is projected onto the film superimposed with the light of the object.

Figure 7:
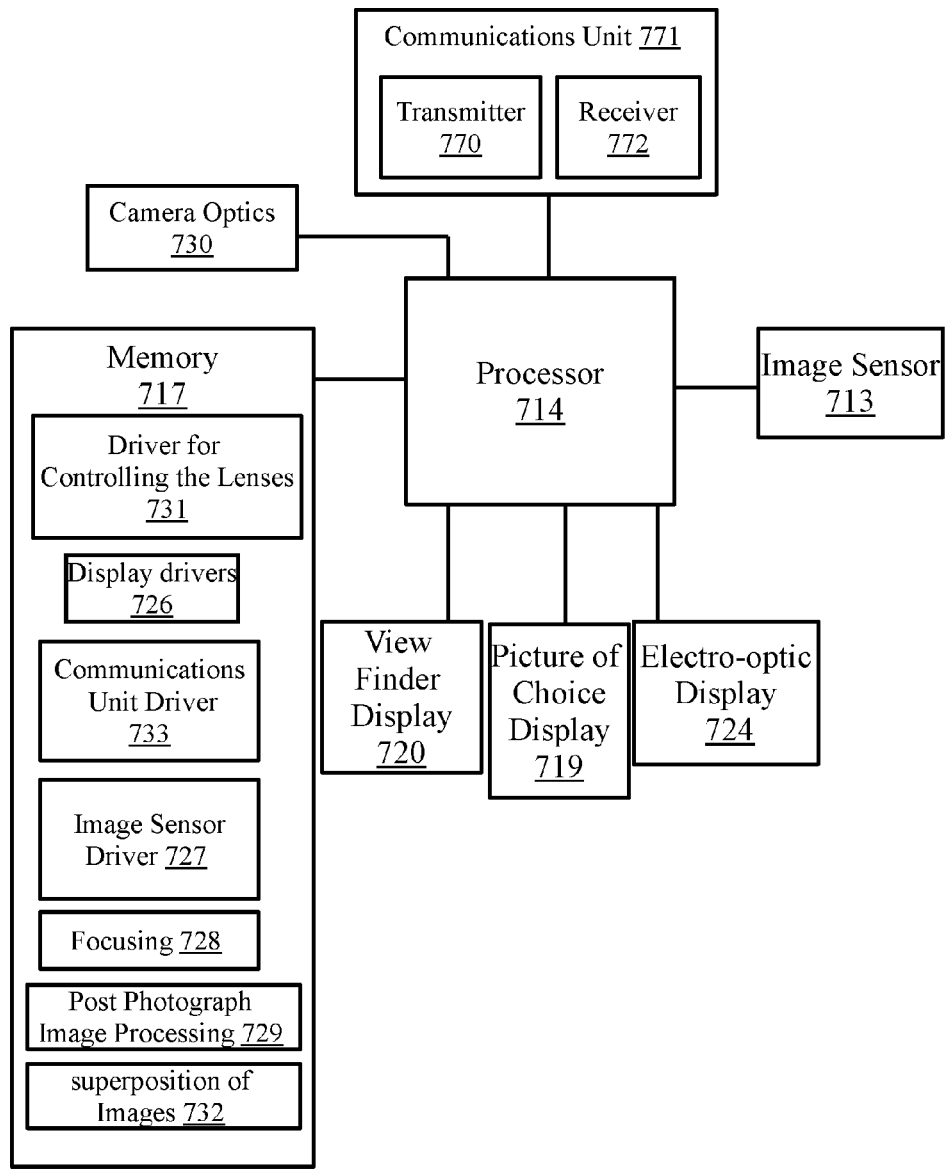
FIG. 7 shows a block diagram of an embodiment of the electronics in the camera for use in the system of FIG. 1.

FIG. 7 shows a block diagram of the electronics for an embodiment of a camera system 700 for use in the system of FIGS. 1-5. The camera 700 may include image sensor 713, processor 714, memory 717, picture of choice display 719, view finder display 720, electro-optic display 724, display drivers 726, image sensor driver 727, focusing 728, post photograph image processing 729, camera optics 730, driver for controlling the lenses 731, superposition of images 732, communications Unit driver 733, communications unit 771 which includes transmitter 770, and receiver 772. In other embodiments camera 700 may not have all of the elements or features listed and/or may have other elements or features instead of or in addition to those listed.

Camera 700 is an embodiment of a camera system in which the processor of the camera performs all of the functions of both the processor 614 and microcontroller 618 of camera system 600 of FIG. 6.

Image sensor 713, processor 714, memory 717, picture of choice display 719, view finder display 720, electro-optic display 724, display drivers 726, image sensor driver 727, focusing 728, post photograph image processing 729, camera optics 730, driver for controlling the lenses 731, superposition of images 732, communications unit driver 733, communications unit 771, transmitter 770, and receiver 772 are embodiments of image sensor 613, processor 614, memory 617, picture of choice display 619, view finder display 620, electro-optic display 624, display drivers 626, image sensor driver 627, focusing 628, post photograph image processing 629, camera optics 630, superposition of images 632, communications unit driver 633, communications unit 671, transmitter 670, and receiver 672 in FIG. 6, respectively.

Figure 8:
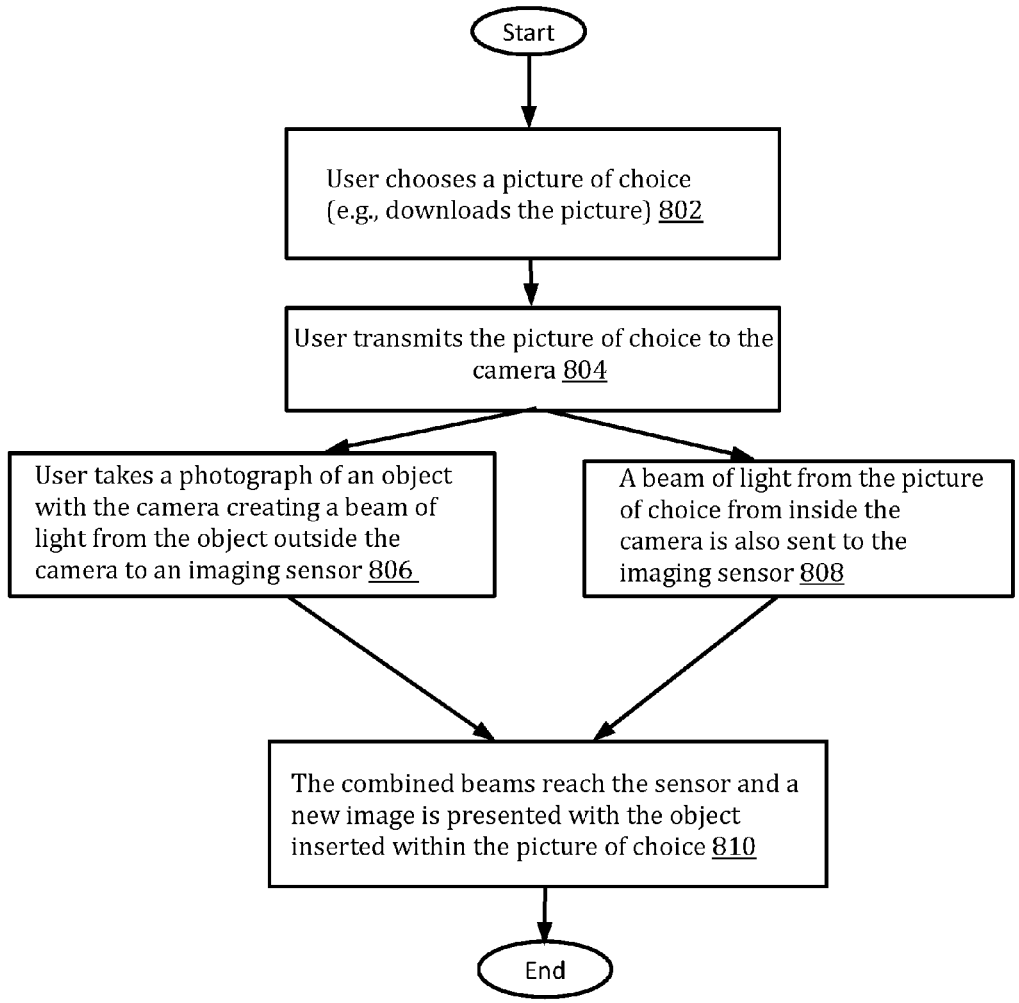
FIG. 8 shows a flowchart of an embodiment of a method of using the camera system of FIG. 1.

FIG. 8 shows a flowchart of an embodiment of a method 800 of using any of the cameras of FIGS. 1-5.

In step 802, the user chooses a picture of choice 195 from a website, a personal picture, etc. The user downloads the picture of choice from the website to the user device 190.

In step 804, the user transmits the picture of choice 195 to the camera system 108, 210, 310, or 410.

In step 806, the user takes a photograph of an object 150 with the camera 110, 210, 310, or 410 creating a beam of light from the object outside the camera 110, 210, 310, or 410 to an image sensor 280, 380, or 480.

In step 808, a beam of light from the picture of choice 195 from inside the camera system 108, 210, 310, or 410 is also sent to the image sensor 280, 380, or 480.

In step 810, the combined beam reaches the sensor array of image sensor 280, 380, or 480 and a new image is presented with the object (from photograph 150) inserted within the picture of choice 195 (a superimposed image). The combining of the beams may occur before the beams reach the image sensor 280, 380, or 480.

In an embodiment, each of the steps of method 800 is a distinct step. In another embodiment, although depicted as distinct steps in FIG. 8, step 802-810 may not be distinct steps. In other embodiments, method 800 may not have all of the above steps and/or may have other steps in addition to or instead of those listed above. The steps of method 800 may be performed in another order. Subsets of the steps listed above as part of method 800 may be used to form their own method.

Figure 9:
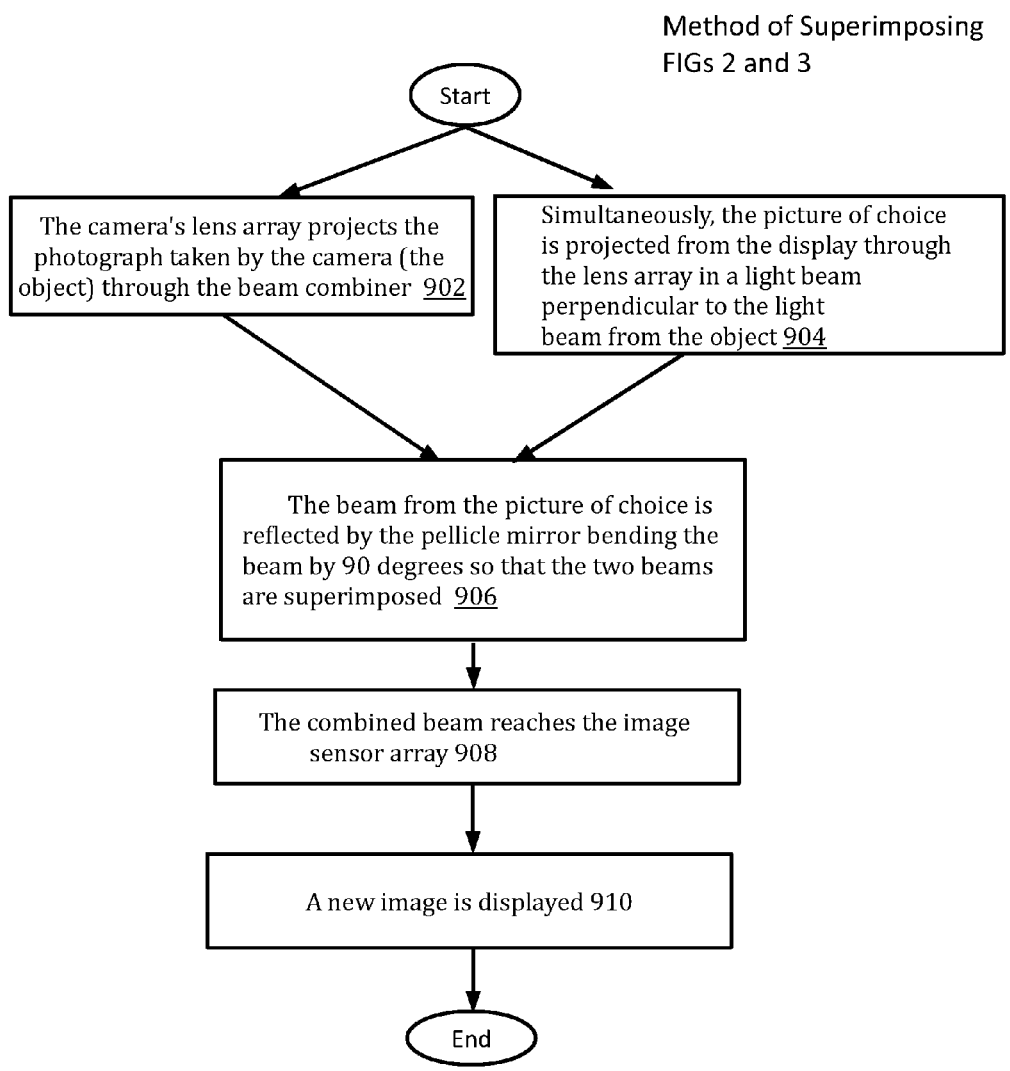
FIG. 9 shows a flowchart of an embodiment of a method of superimposing the two images using the camera of FIGS. 2 and 3.

FIG. 9 shows an embodiment of a method 900 of superimposing an image that can be used in the method of FIG. 8 with the camera of FIG. 2 or 3.

In step 902, the camera system 108, 210, or 310's lens array projects the light from the object external to the camera (in the object beam 215) through the beam combiner 250 or 350 (which may be a pellicle mirror).

In step 904, simultaneously, an image of the picture of choice 195 is produced by electro-optic display 224 or 324 is projected through another lens array in a light beam perpendicular to the light beam from the object, that is, perpendicular to object beam 215.

In step 906, the beam from the picture of choice (downloaded) is reflected by the pellicle mirror bending the beam by 90 degrees so that both beams (object beam 215 are the beam from electro-optic display 224 or 324) are joined.

In step 908, the combined beam reaches the sensor array.

In step 910, a new image is displayed to the user.

In an embodiment, each of the steps of method 900 is a distinct step. In another embodiment, although depicted as distinct steps in FIG. 9, step 902-910 may not be distinct steps. In other embodiments, method 900 may not have all of the above steps and/or may have other steps in addition to or instead of those listed above. The steps of method 900 may be performed in another order. Subsets of the steps listed above as part of method 900 may be used to form their own method.

Figure 10:
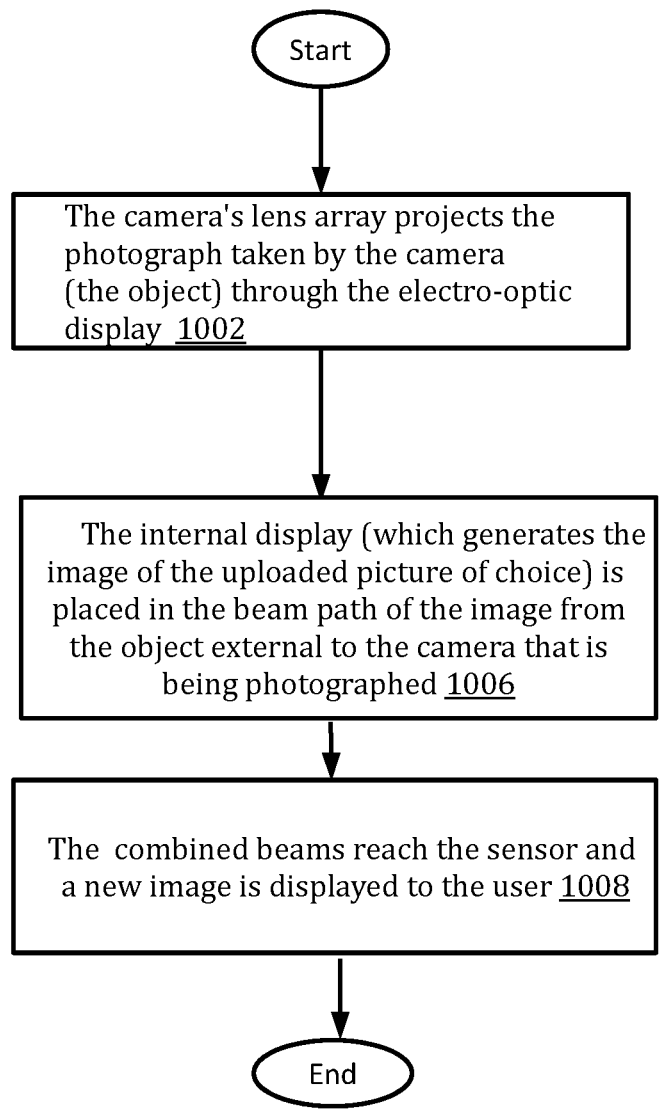
FIG. 10 shows a flowchart of an embodiment of a method of superimposing the two images using the camera of FIG. 5.

FIG. 10 shows an embodiment of a method 1000 of superimposing an image that can be used in the method of FIG. 8 with the camera of FIG. 5.

In step 1002, object beam 515 (FIG. 5) is projected through the camera 510's lens optics assembly 530 and then through the electro-optic display 544.

In step 1006, the internal display, electro-optic display 524 (which generates the image of the uploaded picture of choice 195, FIG. 1), creates an image based on the electrical signals received from the controller. The object beam 515, which carries the image from the object, is modified by the electro-optic display 524, so that the beam exiting the electro-optic display 524 has a combination of the image from the object and the image created by the display (the picture of choice 195). For example, the electro-optic display 524 may keep the pixels in the center of electro-optic display 524 completely transparent, so that the foreground of the image from the object passes through the display unaltered. Whereas, the pixels in the background area may be made translucent but colored, so as to create a background image that is taken from the picture of choice 195 (FIG. 1) downloaded from the internet.

In step 1008 the beam, which exited from the electro-optic display 524, having the combination of the object beam 515 the image from the picture of choice, is transmitted to the image sensor 580 so that the two superimposed images are captured by the image sensor array 580.

In optional step 1010, the image that was captured is converted into electrical signal sent to the viewer's display and displayed to the user.

In an embodiment, each of the steps of method 1000 is a distinct step. In another embodiment, although depicted as distinct steps in FIG. 10, step 1002-1008 may not be distinct steps. In other embodiments, method 1000 may not have all of the above steps and/or may have other steps in addition to or instead of those listed above. The steps of method 1000 may be performed in another order. Subsets of the steps listed above as part of method 1000 may be used to form their own method.

Figure 11:
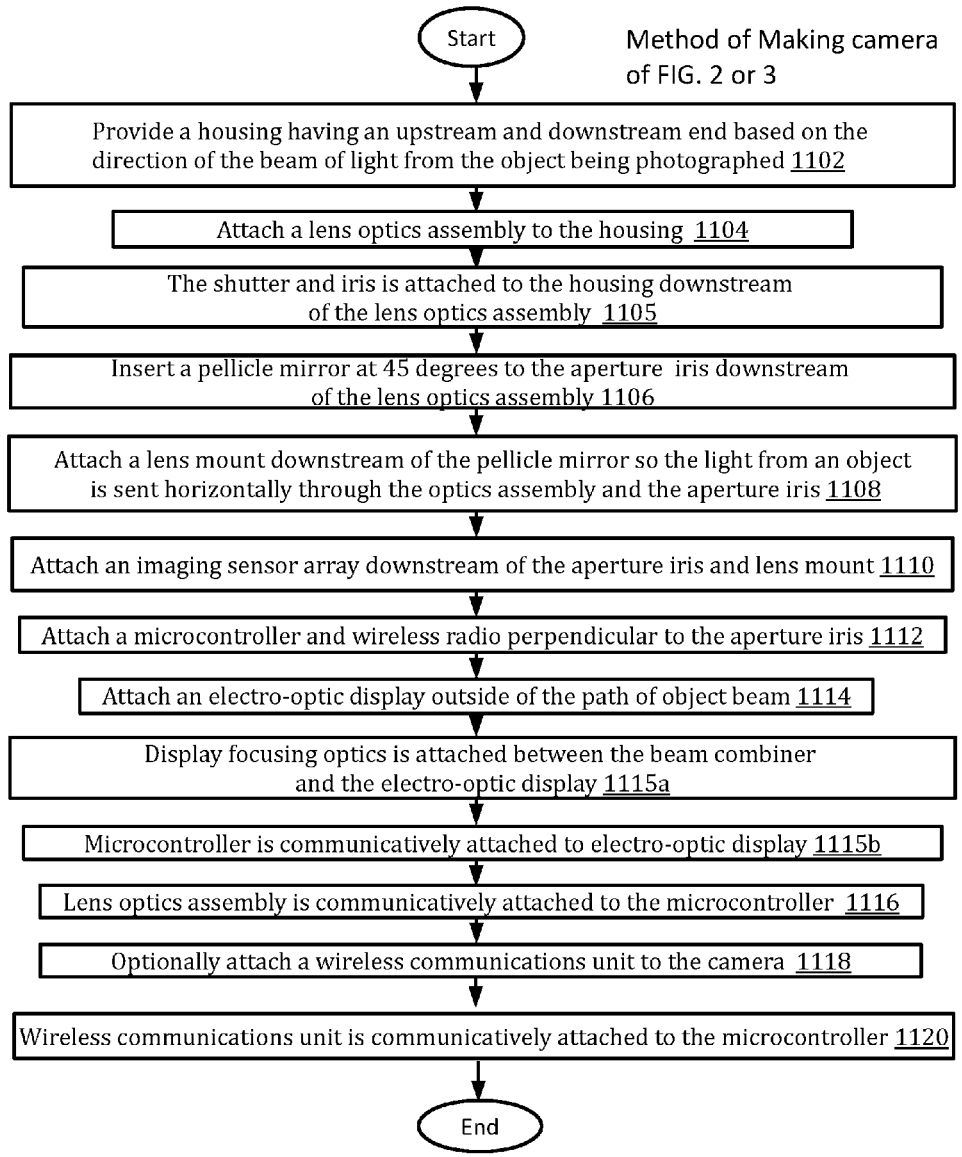
FIG. 11 shows a flowchart of an embodiment of a method of making the camera of FIG. 2.

FIG. 11 shows a flowchart of an embodiment of a method 1100 of making a camera that can be used in the system of FIG. 1. FIG. 11 shows an embodiment of making the camera shown in FIGS. 2 and 3.

In step 1102, a housing is provided (e.g. constructed) having an upstream and downstream end based on the direction of travel that the beam of light reflected and/or generated from the object being photographed would have to travel to enter camera system 108 or 210, via lens optics assembly 230 or 330, while moving towards light sensor 280 or 380.

In step 1104, a lens optics assembly 240 or 340 is attached to the housing at the entrance for light into the camera 210 or 310.

In step 1105, the shutter and iris 250 or 350 is attached to the housing just downstream from lens optics assembly 240 or 340. Optionally, the iris and the shutter may be the same component.

In step 1106, a beam combiner 250 or 350 (e.g., a pellicle mirror) is inserted just downstream from the iris on the opposite side of the iris from lens optics assembly 230 or 330. If the beam combiner includes a semitransparent mirror (e.g., a pellicle mirror), the semitransparent mirror is angled at 45 degrees with respect to the iris and the direction of travel of object beam 215 or 315.

In step 1108, a lens mount 275 or 375 is attached downstream of the beam combiner 250 or 350 so the light exiting from beam combiner 250 or 350 is sent horizontally through lens mount 275 or 375.

In step 1110 an imaging sensor array 280 or 380 is attached downstream from the lens mount 275 or 375 to capture the image exiting the lens mount 275 or 375.

In step 1112, a microcontroller and wireless communications unit is attached to camera 210 or 310. The microcontroller and wireless communications unit could be attached to the camera 210 or 310 at any location, where the microcontroller and the communications unit do not interfere with the optics. In an embodiment, microcontroller and wireless communications unit are attached to a location on camera 210 or 310 that is close to where the electro-optic display 224 or 324 will be located.

In step 1114, an electro-optic display 224 or 324 is attached to camera 210 or 310 outside of the path of object beam 215 or 315 facing beam combiner 250 or 350.

In step 1115a, display focusing optics 225 or 325 is attached in the optical path between the beam combiner 250 or 350 and the electro-optic display 224 or 324, so that light from electro-optic display 224 or 324 is focused by display focusing optics 225 or 325 to travel through beam combiner 250 or 350.

In step 1115b, microcontroller is communicatively attached (e.g., by copper wires) to electro-optic display 224 or 324, so that the microcontroller controls electro-optic display 224 or 324.

In step 1116, lens optics assembly 230 or 330 is communicatively attached (e.g., by copper wires) to the microcontroller or another microcontroller or microprocessor, so that the microcontroller (or the other microcontroller or microprocessor) can electronically control the lens optics assembly 230 or 330.

In step 1118, optionally, a wireless communications unit (and or another communications unit) is attached to the camera 210 or 310 for communicating with user device 190. In other embodiments, the wireless communication unit may be part of the microcontroller or attached/wired to the microcontroller before being attached to the camera.

In step 1120, the wireless communications unit is communicatively attached (e.g., by copper wires) to the microcontroller for transmitting messages to the microcontroller (as mentioned above, in other embodiments, the wireless communication unit maybe part of the microcontroller or attached/wired to the microcontroller before being attached to the camera).

In an embodiment, each of the steps of method 1100 is a distinct step. In another embodiment, although depicted as distinct steps in FIG. 11, step 1102-1120 may not be distinct steps. In other embodiments, method 1100 may not have all of the above steps and/or may have other steps in addition to or instead of those listed above. The steps of method 1100 may be performed in another order. Subsets of the steps listed above as part of method 1100 may be used to form their own method.

Figure 12:
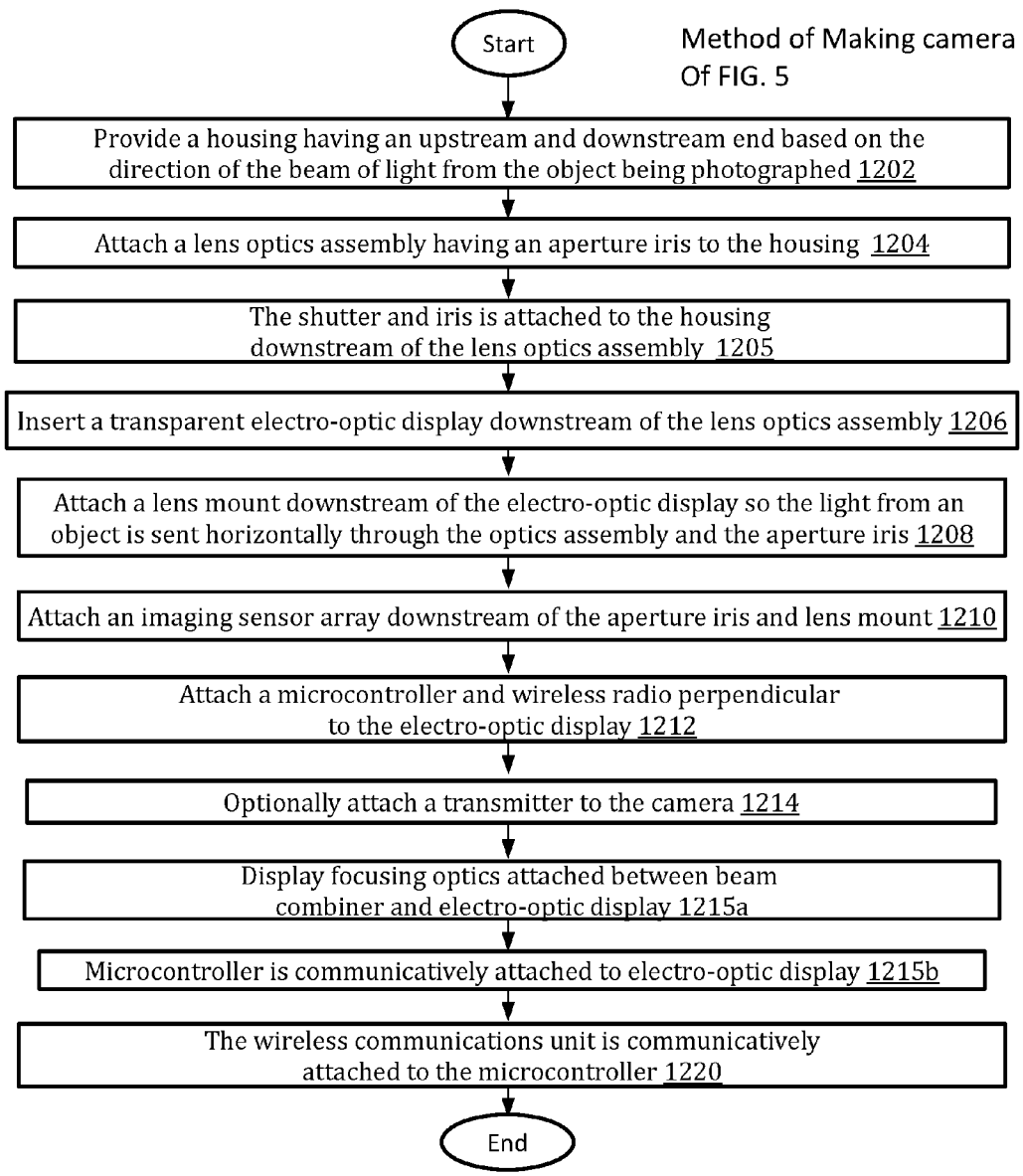
FIG. 12 shows a flowchart of an embodiment of a method of making the camera of FIG. 5.

FIG. 12 shows a flowchart of an embodiment of a method 1200 of making a camera system 108 or 410 that can be used in the system of FIG. 1. FIG. 12 shows an embodiment of making the camera shown in FIG. 4.

In step 1202 a housing is provided having an upstream and downstream end based on the direction of the beam of light from the object being photographed.

In step 1204 a lens optics assembly having an aperture iris is attached to the housing.

In step 1205 a shutter and iris is attached to the housing just downstream from the lens optics assembly.

In step 1206 a transparent electro-optic display 524 is placed downstream from the lens optics assembly 530.

In step 1208 a lens mount 675 is attached downstream of the electro-optic display 624 so the light from an object is sent horizontally through the lens optics assembly 630, then through the iris, next through electro-optic display 624 and then through lens mount 675.

In step 1210 an image sensor 680 is attached downstream from lens mount 675 (and the light is captured by image sensor 680).

In step 1212, a microcontroller and wireless communications device is attached perpendicular to the aperture iris.

In step 1214, optionally, a transmitter is attached to the camera.

In step 1215*a*, display focusing optics 225 or 325 is attached in the optical path between the beam combiner 250 or 350 and the electro-optic display 224 or 324, so that light from electro-optic display 224 or 324 is focused by display focusing optics 225 or 325 to travel through beam combiner 250 or 350.

In step 1215*b*, microcontroller is communicatively attached (e.g., by copper wires) to electro-optic display 224 or 324, so that the microcontroller controls electro-optic display 224 or 324.

In step 1220, the wireless communications unit is communicatively attached (e.g., by copper wires) to the microcontroller for transmitting messages to the microcontroller (as mentioned above, in other embodiments, the wireless communication unit maybe part of the microcontroller or attached/wired to the microcontroller before being attached to the camera).

In an embodiment, each of the steps of method 1200 is a distinct step. In another embodiment, although depicted as distinct steps in FIG. 12, step 1202-1220 may not be distinct steps. In other embodiments, method 1200 may not have all of the above steps and/or may have other steps in addition to or instead of those listed above. The steps of method 1200 may be performed in another order. Subsets of the steps listed above as part of method 1200 may be used to form their own method.

ALTERNATIVES AND EXTENSIONS

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A system comprising:
   an image sensor;
   a beam combiner;
   a lens array located in the system so as to project light from an object onto the image sensor via the beam combiner; and
   an electro-optic display, which is located in the system, so that, when activated, a picture of choice is projected onto the image sensor superimposed with the light of the object via the beam combiner;
   wherein no lenses are located between the beam combiner and the image sensor.

2. A system comprising:
   an image sensor;
   an electro-optic display; and
   a lens array located in the system so as to project light from an object through the electro-optic display onto the image sensor; wherein
   the electro-optic display that is a transparent display and is mounted in a path of the light coming from the object, the electro-optic display causes a picture of choice to be projected onto the image sensor, the image of choice being superimposed with the light from the object on the image sensor,
   wherein no lenses are located between the electro-optic display and the image sensor.

3. The system of claim 1, wherein
   the beam combiner combines the light from the object and light from the electro-optic display, where the light from the electro-optic display contains information for forming an image of the picture of choice, so that an image of the object and an image of the picture of choice are superimposed on one another on the image sensor with the image of the object and the image of the picture of choice being equally in focus and equally out of focus at the image sensor.

4. The system of claim 1 further comprising a transmitter, which when activated communicates with a wireless device, receiving one or more pictures of choice from the wireless device and superimposing the received one or more pictures of choice on an image of the object for making a photograph.

5. The system of claim 1, further comprising display focusing optics that focus the picture of choice onto the image sensor.

6. The system of claim 1, further comprising an aperture iris.

7. The system of claim 1, further comprising a lens mount.

8. The system of claim 1, further comprising a chip that functions to receive the picture of choice from a wireless device.

9. The system of claim 8, wherein the chip includes a receiver and/or a transmitter.

10. The system of claim 1, wherein a focus of the object and a focus of the picture of choice are the same.

11. The system of claim 1, wherein the picture of choice is an image of background scenery.

12. The system of claim 1, further comprising a housing and a second display built into an outside of the housing facing in a direction so as to be visible by a viewer looking at the housing; when activated, the second display displaying a view of the picture of choice being superimposed with the light from the object.

13. The system of claim 1, further comprising a positive lens group and a negative lens group, the positive lens group and negative lens group being located in series along an optical axis of light from the object, so as to receive light from the object at location spacially prior to a location where image information from the object and image information from the picture of choice are combined.

14. The system of claim 1, further comprising a first lens group and a second lens group, the first lens group and the second lens group being located in series along an optical axis of light from the object, so as to receive light from the object at location spacially prior to a location where image information from the object and image information from the picture of choice are combined, the first lens group being detachable from the system, without detaching the second lens group, and the second lens group including at least a negative lens group for extending a point where the light from the object comes to a focus, so as to come to a focus at the image sensor.

15. The system of claim 1, further comprising a processor and a memory storing machine instructions, which when implemented by the processor controls the electro-optic display to create the image of the picture of choice; the machine instructions, when implemented by the processor causes the image of the picture of choice displayed by the electro-optic to be in focus to a same extent that the image from the object is in focus.

16. The system of claim 3, wherein the beam combiner is a pellicle mirror and wherein the pellicle mirror is placed at 45° to the lens array.

17. A system comprising:
film;
an electro-optic display; and
a lens array located in the system so as to project light from an object through the electro-optic display onto the film; wherein the electro-optic display, which is located in the system, so that, when activated, a picture of choice is projected onto the film superimposed with the light of the object;
wherein no lenses are located between the electro-optic display and the film.

18. A method comprising:
projecting an image of an object, through a lens array and an electro-optic display onto an image sensor array; and
projecting, by the electro-optic display, a stored image of choice onto the image sensor array, simultaneously with the image from the object, forming a combined image, where the combined image is a superposition of the image of the object and the stored image that was projected;
wherein no lenses are located between the electro-optic display and the image sensor.

19. The method of claim 18, further comprising adjusting focus of the image of the object to be the same as the stored image.

20. The method of claim 18, wherein an image of the object is inserted within an image of the picture of choice.

21. The method of claim 18, the projecting of the stored image including projecting a portion of an image of the picture of choice where an image of the object appears as blank.

22. The method of claim 18, further comprising adjusting a relative brightness of the image of choice and an image of the object to reduce ghosting.

23. A method comprising:
projecting a photograph containing an object taken by an image sensor of a camera through a beam combiner within the camera;
simultaneously projecting a picture of choice through a lens array in a light beam perpendicular to a light beam from the object; and
combining, by the beam combiner, the beam from the object and the light beam perpendicular to the light beam from the object onto the image sensor to display a superimposed image;
wherein no lenses are located between the beam combiner and an image sensor.

24. A system, comprising:
a lens mount; the lens mount being configured to be removably attach the system to a camera having an image sensor;
a lens array located in the system so as to project light from an object onto the image sensor, creating an image of the object; and
an electro-optic display, which is located in the system, being configured for creating an image of a picture of choice, the electro-optic display being located so that light from the object travels through the electro-optic display, therein superimposing image information about the picture of choice with image information about the object in a light beam;
the lens array, electro-optic display, and lens mount being arranged such that the light beam from the electro-optic display having the image information about the picture of choice with image information about the object superimposed is projected through the lens mount in a light path, starting at the object and continuing through the lens mount;
wherein no lenses are located between the electro-optic display and the image sensor.

25. The system of claim 24, wherein a light path carrying image information from the picture of choice is coincident with a light path carrying image information from the object.

26. The system of claim 24, the lens mount being a first lens mount, the system further comprising:
a housing that houses the electro-optic display, and
a second lens mount, the first lens mount and second lens mount being located such that an optical axis of the light from the object passes through the first lens mount and second lens mount, the first lens mount and second lens mount are located on opposite ends of the housing, the second lens mount being for removably attaching lenses to the housing at a point where light from the object first enters the housing and the first lens mount being located at a point along the optical axis where light from the object leaves the housing, and via the first lens mount, the housing removably attaches to the camera.

* * * * *